(12) United States Patent
Imai et al.

(10) Patent No.: US 12,578,468 B2
(45) Date of Patent: Mar. 17, 2026

(54) OPTICAL COMB GENERATION DEVICE

(71) Applicant: SUZHOU HYC TECHNOLOGY CO., LTD., Suzhou City (CN)

(72) Inventors: Kazuhiro Imai, Tokyo (JP); Motonobu Kourogi, Tokyo (JP)

(73) Assignee: SUZHOU HYC TECHNOLOGY CO., LTD., Suzhou City (CN)

( * ) Notice: Subject to any disclaimer, the term of this patent is extended or adjusted under 35 U.S.C. 154(b) by 356 days.

(21) Appl. No.: 18/553,055

(22) PCT Filed: Dec. 2, 2021

(86) PCT No.: PCT/JP2021/044296
§ 371 (c)(1),
(2) Date: Sep. 28, 2023

(87) PCT Pub. No.: WO2022/209008
PCT Pub. Date: Oct. 6, 2022

(65) Prior Publication Data
US 2024/0192365 A1 Jun. 13, 2024

(30) Foreign Application Priority Data
Mar. 29, 2021 (JP) ................................. 2021-055640

(51) Int. Cl.
*G01S 17/32* (2020.01)
*G01S 7/4911* (2020.01)
*G02F 1/35* (2006.01)

(52) U.S. Cl.
CPC ............. *G01S 17/32* (2013.01); *G01S 7/4911* (2013.01); *G02F 1/353* (2013.01)

(58) Field of Classification Search
CPC ......... G01S 17/32; G01S 7/4911; G02F 1/353
See application file for complete search history.

(56) References Cited

U.S. PATENT DOCUMENTS 6,493,091 B2 * 12/2002 Kourogi ............. G01N 21/4795
356/489
2015/0236467 A1 8/2015 Schneider

FOREIGN PATENT DOCUMENTS

EP 4332667 3/2024
JP S63243777 A 10/1988
(Continued)

*Primary Examiner* — Kenneth N Vanderpuye
*Assistant Examiner* — Asif Shameem
(74) *Attorney, Agent, or Firm* — Birch, Stewart, Kolasch & Birch, LLP

(57) ABSTRACT

A purpose of the present invention is to provide an optical comb generation device capable of obtaining an absolute distance result with high accuracy by reducing a phase offset by a signal transmission path of an object other than an object to be measured, for example in an optical comb distance meter for measuring a distance from a time difference between an interference signal of a measuring light and an interference signal of a reference light. A drive control unit controls to output M (M is an integer of two or more) types of optical combs with mutually different modulation frequencies in which N (N is an integer of three or more) types of modulation frequencies are switched cyclically, by respectively modulating a phase or an intensity periodically, from M optical comb generators, by supplying driving signals to the M optical comb generators comprised in an optical comb generation unit.

6 Claims, 8 Drawing Sheets

(56)              References Cited

FOREIGN PATENT DOCUMENTS

| JP | H09152482 | A | 6/1997 |
|----|-----------|---|--------|
| JP | 2004512556 | A | 10/2000 |
| JP | 2001343234 | A | 12/2001 |
| JP | 2009284074 | | 12/2009 |
| JP | 2010014549 | | 1/2010 |
| JP | WO2010001809 | | 1/2010 |
| JP | 2011007805 | A | 1/2011 |
| JP | 2011027649 | | 2/2011 |
| JP | WO2012176366 | | 12/2012 |
| JP | B005231883 | | 7/2013 |
| JP | 2013178169 | A | 9/2013 |
| JP | 2015178981 | A | 10/2015 |
| JP | 6019360 | B2 * | 11/2016 |
| JP | WO2014203654 | | 2/2017 |
| JP | 2017150882 | A | 8/2017 |
| JP | 2020012641 | A | 1/2020 |

* cited by examiner

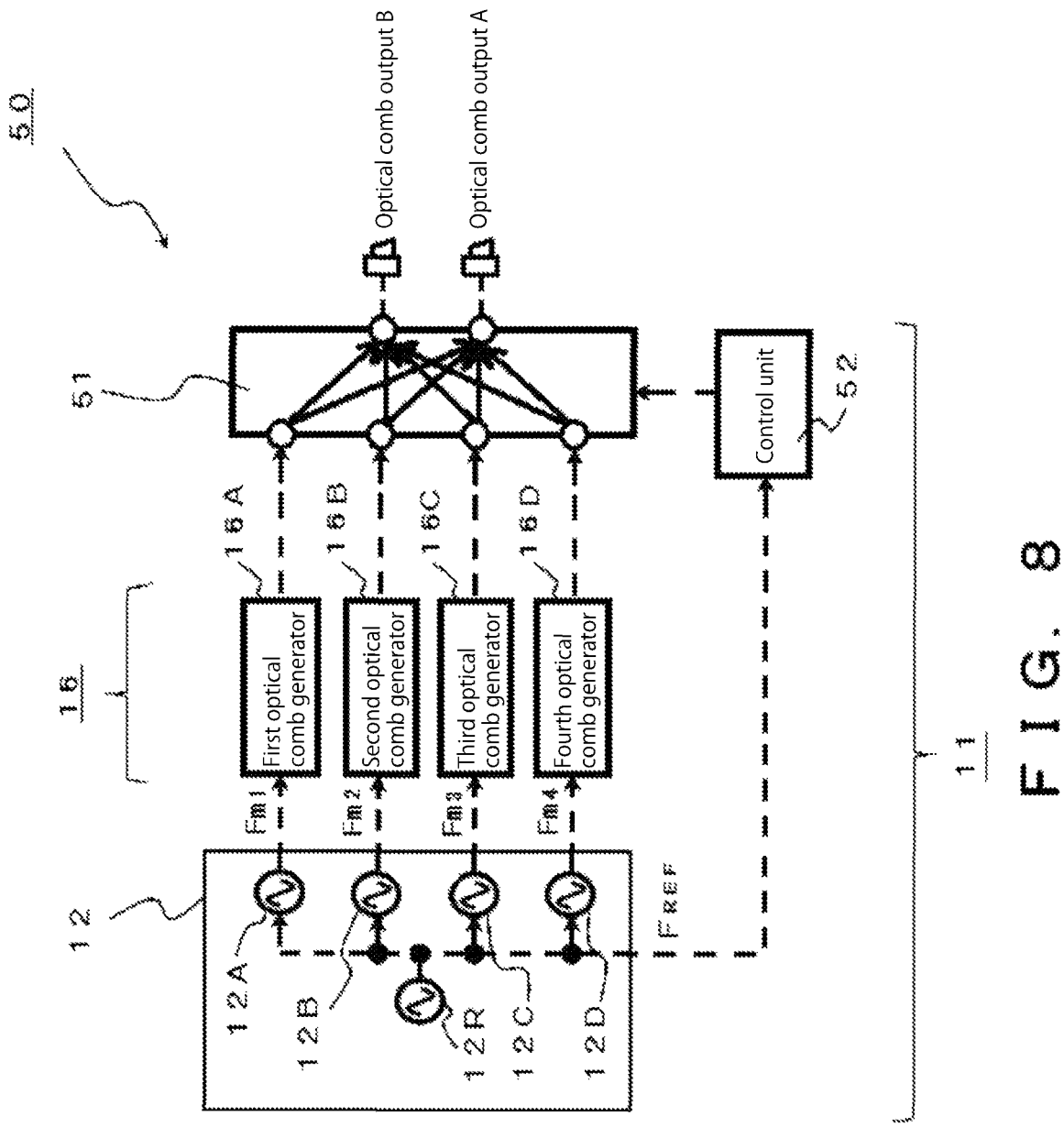
F I G. 8

OPTICAL COMB GENERATION DEVICE

BACKGROUND OF THE INVENTION

Field of the Invention

The present invention relates to an optical comb generation device used for example for an optical comb distance meter for measuring a distance from a time difference between an interference signal of a measuring light and an interference signal of a reference light. The present application claims priority based on Japanese Patent Application No. 2021-055640 filed in Japan on Mar. 29, 2021, which is incorporated by reference herein.

Description of Related Art

Conventionally, as an active distance measuring method capable of measuring a precise distance of a point, a distance measurement by a principle of optics using a laser light is known. In a laser distance meter for measuring a distance to a target object by using a laser light, a distance to an object to be measured is calculated based on a difference between a time of emission of a laser light and a time when the laser light reflected from the object to be measured is detected by a light receiving element (for example, refer to Patent Document 1). Also, for example, a driving current of a semiconductor laser is modulated by a triangular wave or the like, and a reflected light from a target object is received by using a photodiode embedded in a semiconductor laser element, and a distance information is obtained from a frequency of a sawtooth wave occurred in a photodiode output current.

A laser distance meter as a device for measuring an absolute distance from a certain point to a measuring point with high accuracy is known. For example, in Patent Document 1, a distance meter for measuring a distance from a time difference between an interference signal of a measuring light and an interference signal of a reference light is described.

In a conventional absolute distance meter, it was difficult to achieve a practical absolute distance meter capable of measuring a long distance with high accuracy. Also, in order to obtain high resolution, a return to origin was necessary as a laser interferometer. So, there was only a method or means not suitable for an absolute distance measurement.

The present inventors have previously proposed an optical comb distance meter, comprising two optical comb generators for emitting pulses of a reference light and a measuring light with a coherence and mutually different modulation frequencies, respectively modulated of its phase or intensity periodically, wherein a reference light detector detects an interference light of a reference light pulse emitted to a reference surface and a measuring light pulse emitted to a measuring surface, and a measuring light detector detects an interference light of the reference light pulse reflected from the reference surface and the measuring light pulse reflected from the measuring surface, wherein the optical comb distance meter is capable of measuring a distance with high accuracy and in short time by calculating a difference between a distance to the reference surface and a distance to the measuring surface from a time difference of two interference signals obtained by the reference light detector and the measuring light detector (for example, refer to Patent Document 2).

Also, the present inventors have previously proposed an optical comb distance meter capable of measuring a long distance with high accuracy and in short time by defining a position of a reference point of a distance to a measuring surface by a reference light path (for example, refer to Patent Document 3).

In an optical comb distance meter, by using a reference light pulse and a measuring light pulse with coherence emitted as a pulse from two optical comb generators driven by two types of modulation signals with different frequencies in principle, a frequency analysis of an interference signal (hereinafter, referred to as a reference signal) obtained by a reference light detector and an interference signal (hereinafter, referred to as a measuring signal) obtained by a measuring light detector is performed by a signal processing unit, and a mode number counted from a center frequency of an optical comb is defined as P, a phase difference of P-order mode of the reference signal and the measuring signal is calculated to offset a light phase difference of an optical comb production and transmission process from the optical comb generators to a reference point, and then, a distance from the reference point to the measuring surface is calculated by determining a phase difference of a reference signal pulse and a measuring signal pulse by calculating an increment of a phase difference per one order in a frequency axis.

Here, a measuring speed of a relative distance measurement in an optical comb distance meter using a reference light pulse and a measuring light pulse output from two optical comb generators driven by a pair of modulation signals, which are having a frequency difference $\Delta f$ (for example, 500 kHz) and a modulation frequency of microwave band, is decided by a frequency difference $\Delta f$ of the modulation frequency, and in an absolute distance measurement, it is necessary to calculate an absolute distance from each phase obtained by performing distance measurements plurally by switching a modulation frequency of the reference light pulse and the measuring light pulse.

Patent Document 1: JP 2001-343234 A
Patent Document 2: JP 5231883 B
Patent Document 3: JP 2020-12641 A

SUMMARY OF THE INVENTION

In an optical comb distance meter for measuring a distance from a time difference between an interference signal of a measuring light and an interference signal of a reference light, a distance measurement is performed by alternately switching two types of modulation signals for driving two optical comb generators in principle, but there is a problem that a phase offset by a signal transmission path of an object other than an object to be measured will be a measurement error. Also, there is a problem that it is necessary to consider about when the object to be measured is moving with speed.

Considering the above problems, a purpose of the present invention is to provide an optical comb generation device capable of obtaining an absolute distance result with high accuracy by reducing a phase offset by a signal transmission path of an object other than an object to be measured, for example in an optical comb distance meter for measuring a distance from a time difference between an interference signal of a measuring light and an interference signal of a reference light.

Also, other purpose of the present invention is to provide an optical comb generation device capable of performing an absolute distance measurement with high accuracy, even with respect to a moving body in which a measuring time of an absolute distance is required to be shortened as a moving speed increases.

Other purpose of the present invention, and concrete advantages obtained by the present invention will be clearer from an explanation of embodiments explained in below.

The present invention is an optical comb generation device for an optical comb distance measurement for measuring a distance from a time difference between an interference signal of a measuring light and an interference signal of a reference light, comprising: an optical comb generation unit comprising M (M is an integer of two or more) optical comb generators; and a drive control unit for controlling to output M types of optical combs from the optical comb generation unit by supplying M types of driving signals with mutually different modulation frequencies, in which N (N is an integer of three or more) types of modulation frequencies phase-locked to a reference frequency signal are switched cyclically, to the M optical comb generators, wherein the optical comb generation unit outputs, from the M optical comb generators, M types of optical combs with mutually different modulation frequencies in which N types of modulation frequencies are switched cyclically, by respectively modulating a phase or an intensity periodically.

In the optical comb generation device relating to the present invention, the drive control unit comprises: N signal sources for outputting N types of modulation signals with mutually different modulation frequencies phase-locked to the reference frequency signal; a switching unit with N inputs and M outputs connected to the N signal sources; and a switching control means for outputting M types of modulation signals with mutually different modulation frequencies in which N types of modulation signals are switched cyclically by controlling an operation of the switching unit, wherein the M types of modulation signals may be supplied to the M optical comb generators as driving signals.

Also, in the optical comb generation device relating to the present invention, the N signal sources generate N types of modulation signals respectively in a state that a modulation frequency is fixed to a modulation frequency phase-locked to a reference frequency signal by a PLL circuit.

Further, in the optical comb generation device relating to the present invention, the drive control unit comprises: a signal source consisting of M DDS (Direct Digital Synthesizer) operating by a system clock phase-locked to the reference frequency signal; and a switching control means for outputting M types of modulation signals with mutually different modulation frequencies in which N types of modulation frequencies are switched cyclically by controlling an operation of the M DDS, wherein the M types of modulation signals may be supplied to the optical comb generation unit as driving signals.

Also, the present invention is an optical comb generation device for an optical comb distance measurement for measuring a distance from a time difference between an interference signal of a measuring light and an interference signal of a reference light, comprising: N signal sources for outputting N types of modulation signals with mutually different modulation frequencies phase-locked to a reference frequency signal as driving signals; an optical comb generation unit comprising N optical comb generators for generating N types of optical combs with mutually different modulation frequencies by respectively modulating a phase or an intensity periodically and driven by the driving signals output from the N signal sources; an optical switch with N inputs and M outputs for outputting M types of optical combs with mutually different modulation frequencies by cyclically selecting from N types of optical combs generated by the N optical comb generators comprised in the optical comb generation unit; and an optical switch control unit for controlling an operation to select optical combs by the optical switch by synchronizing to the reference frequency signal.

Further, in the optical comb generation device relating to the present invention, the drive control unit controls to output, from the optical comb generation unit, M (M is an integer of two or more) types of optical combs with mutually different modulation frequencies in which N (N is an integer of three or more) types of modulation frequencies are switched cyclically, in a cyclic way to switch one direction and inverse direction of a switching order successively.

In the present invention, in an optical comb distance meter for measuring a distance from a time difference between an interference signal of a measuring light and an interference signal of a reference light, by outputting M (M is an integer of two or more) types of optical combs with mutually different modulation frequencies in which N (N is an integer of three or more) types of modulation frequencies are switched cyclically, by respectively modulating a phase or an intensity periodically, by supplying M types of driving signals phase-locked to a reference frequency signal to an optical comb generation unit, an absolute distance result with high accuracy is obtained by reducing a phase offset by a signal transmission path of an object other than an object to be measured.

Also, according to the present invention, an optical comb generation device capable of performing an absolute distance measurement with high accuracy by shortening a measuring time of an absolute distance, even with respect to a moving body in which a measuring time of an absolute distance is required to be shortened as moving speed increases, is provided.

BRIEF DESCRIPTION OF THE DRAWINGS

FIG. 8 is a block diagram illustrating an example of the optical comb generation device relating to the present invention in which optical combs are switched by an optical switch.

DETAILED DESCRIPTION OF THE INVENTION

Figure 1:
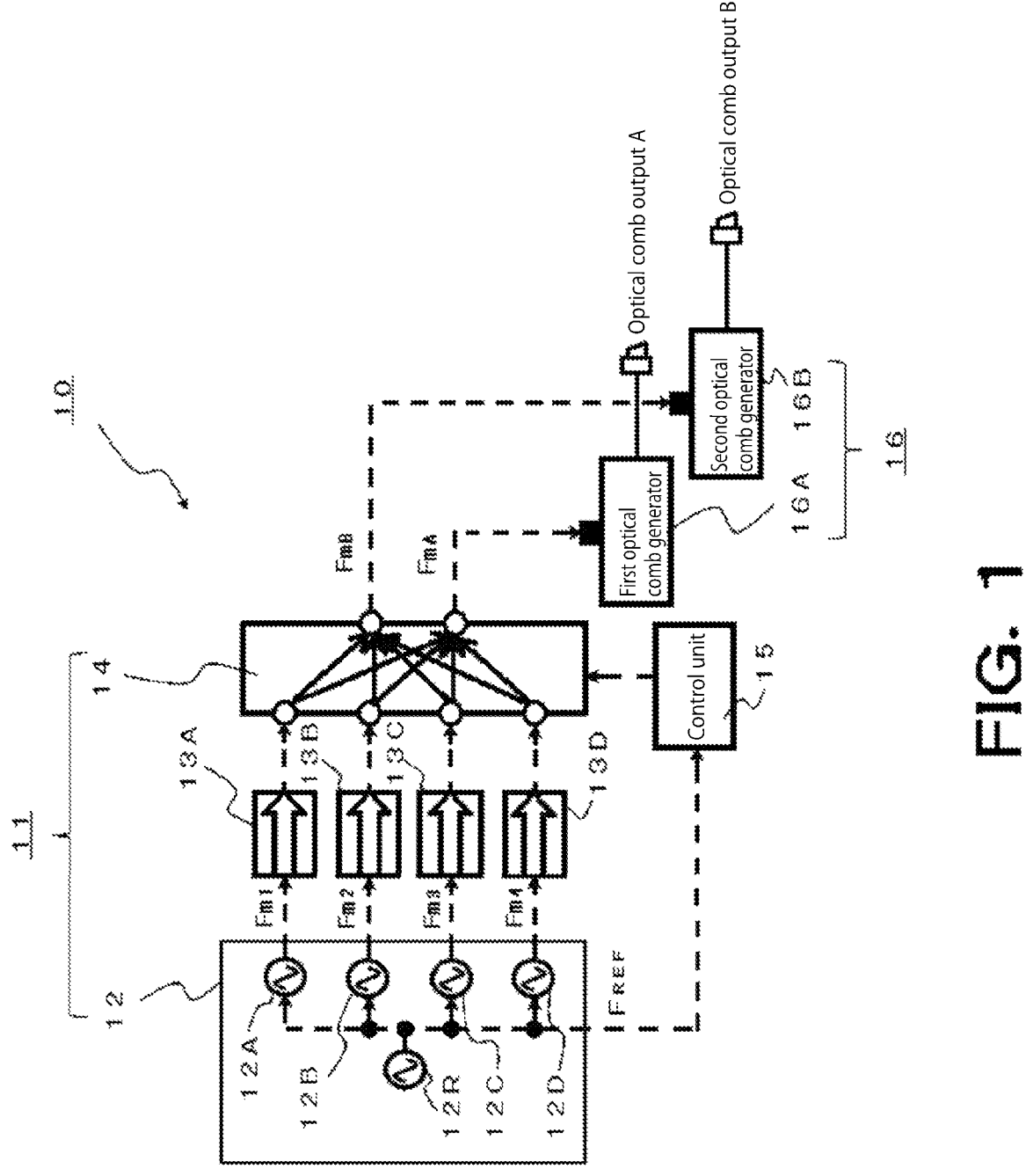
FIG. 1 is a block diagram illustrating an example of an optical comb generation device applying the present invention.

Hereinafter, explaining in detail about preferred embodiments of the present invention, with reference to the drawings. In addition, about common components, it is explained by giving common reference number in the drawings. Also, the present invention should not be limited to the following examples, it goes without saying that it can be changed optionally within a scope not deviating from a gist of the present invention.

For example, as illustrated in a block diagram of FIG. 1, the present invention is applied to an optical comb generation device 10 comprising two optical comb generators 16A, 16B for emitting a reference light and a measuring light with a coherence and mutually different modulation frequencies, respectively modulated of its phase or intensity periodically.

This optical comb generation device 10 is used as a light source for emitting a reference light and a measuring light with a coherence and mutually different modulation frequencies, respectively modulated of its phase or intensity periodically, in a three-dimensional profiler or an optical comb distance meter for measuring a distance from a time difference of an interference signal of a reference light and an interference signal of a measuring light, for example as described in Patent Document 1, Patent Document 2, and else.

This optical comb generation device 10 outputs M (M is an integer of two or more) types of optical combs with mutually different modulation frequencies in which N (N is an integer of three or more) types of modulation frequencies are switched cyclically, by respectively modulating a phase or an intensity periodically, by an optical comb generation unit 16 to which M (M is an integer of two or more) types of driving signals with mutually different modulation frequencies in which N (N is an integer of three or more) types of modulation frequencies are switched cyclically from a drive control unit 11, wherein N=4, and M=2, by giving M (M=2) types of driving signals $F_{mA}$, $F_{mB}$ with mutually different modulation frequencies in which N (N=4) types of modulation frequencies are switched cyclically from the drive control unit 11 to M (M=2) optical comb generators 16A, 16B comprised in the optical comb generation unit 16, M (M=2) types of optical combs with mutually different modulation frequencies in which N (N=4) types of modulation frequencies are switched cyclically, by respectively modulating a phase or an intensity periodically, is output from the optical comb generators 16A, 16B.

The drive control unit 11 in the optical comb generation device 10 comprises: a modulation signal generation unit 12 comprising N (N=4) PLL oscillators 12A, 12B, 12C, 12D for generating N (N=4) types of modulation signals $F_{m1}$, $F_{m2}$, $F_{m3}$, $F_{m4}$ with mutually different fixed frequencies phase-locked to a reference frequency signal $F_{REF}$ given by a reference oscillator 12R; a switching unit 14 with N (N=4) inputs and M (M=2) outputs to which N (N=4) types of modulation signals $F_{m1}$, $F_{m2}$, $F_{m3}$, $F_{m4}$ are input from the modulation signal generation unit 12; and a control unit 15 for controlling a switching of selected output of the modulation signals $F_{m1}$, $F_{m2}$, $F_{m3}$, $F_{m4}$ by the switching unit 14.

A first PLL oscillator 12A generates a first modulation signal $F_{m1}$ fixed to a first frequency $f_m$ ($f_m$=25000 MHZ) phase-locked by a PLL circuit to the reference frequency signal $F_{REF}$ generated by the reference oscillator 12R.

Also, a second PLL oscillator 12B generates a second modulation signal $F_{m2}$ fixed to a second frequency $f_m+\Delta f_m$ ($f_m+\Delta f_m$=25010 MHZ) phase-locked by the PLL circuit to the reference frequency signal $F_{REF}$ generated by the reference oscillator 12R.

Also, a third PLL oscillator 12C generates a third modulation signal $F_{m3}$ fixed to a third frequency $f_m+\Delta f$ ($f_m+$ $\Delta f$=25000.5 MHZ) phase-locked by the PLL circuit to the reference frequency signal $F_{REF}$ generated by the reference oscillator 12R.

Further, a fourth PLL oscillator 12D generates a fourth modulation signal $F_{m4}$ fixed to a fourth frequency $f_m+\Delta f+\Delta f_m$ ($f_m+\Delta f+\Delta f_m$=25010.5 MHz) phase-locked by the PLL circuit to the reference frequency signal $F_{REF}$ generated by the reference oscillator 12R.

In addition, in this drive control unit 11, isolators 13A, 13B, 13C, 13D are inserted between the modulation signal generation unit 12 and the switching unit 14, and N (N=4) types of modulation signals $F_{m1}$, $F_{m2}$, $F_{m3}$, $F_{m4}$ are input from the modulation signal generation unit 12 to the switching unit 14 via the isolators 13A, 13B, 13C, 13D.

By inserting the isolators 13A, 13B, 13C, 13D, and by inputting the modulation signals $F_{m1}$, $F_{m2}$, $F_{m3}$, $F_{m4}$ from the modulation signal generation unit 12 to the switching unit 14 via the isolators 13A, 13B, 13C, 13D, an operation of a signal source (PLL oscillators 12A, 12B, 12C, 12D) is prevented from being unstable with a load fluctuation by an opening or a short-circuit of circuits in and after the switching unit 14.

As the isolators 13A, 13B, 13C, 13D, a microwave amplifier with large reverse isolation, a Pi-pad attenuator or a T-pad attenuator, an isolation element such as a microwave isolator using ferrite, and an isolation circuit combining a variable attenuator and a band pass filter, or an isolation circuit combining an isolation amplifier and a resistance attenuator or a band pass filter, can be used.

And, the switching unit 14 functions as a selector switch with four inputs and two outputs for switching the four types of modulation signals $F_{m1}$, $F_{m2}$, $F_{m3}$, $F_{m4}$ to be supplied as the driving signals $F_{mA}$, $F_{mB}$ to the two optical comb generators 16A, 16B comprised in the optical comb generation unit 16 connected to two output terminals, by alternately outputting the four types of modulation signals $F_{m1}$, $F_{m2}$, $F_{m3}$, $F_{m4}$ input from the modulation signal generation unit 12 via the isolators 13A, 13B, 13C, 13D from the two output terminals by switching the modulation signals cyclically.

Figure 2:
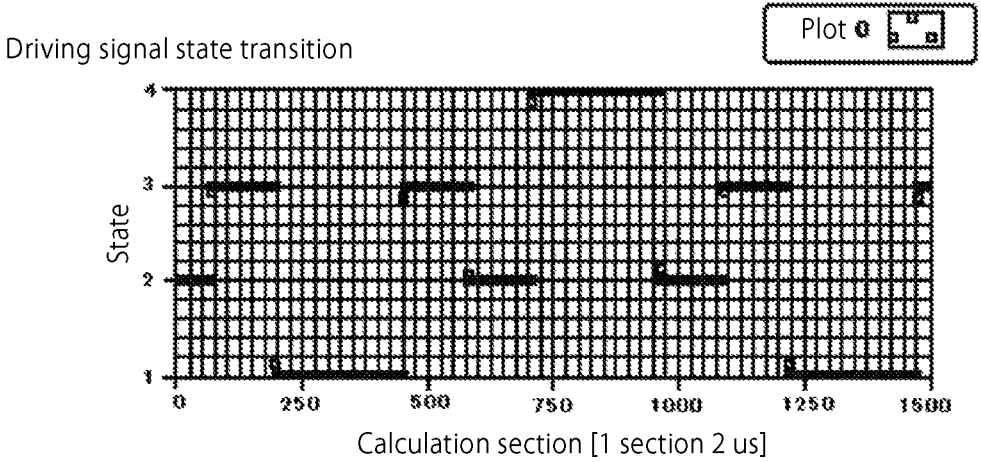
FIG. 2 is a state transition diagram illustrating a state transition of driving signals supplied to two optical comb generators in the optical comb generation device.

As a transition state of the driving signals $F_{mA}$, $F_{mB}$ to the two optical comb generators 16A, 16B comprised in the optical comb generation unit 16 in the optical comb generation device 10 is illustrated in FIG. 2, the switching unit 14 cyclically switches the four types of modulation signals $F_{m1}$, $F_{m2}$, $F_{m3}$, $F_{m4}$ to be supplied as the driving signals $F_{mA}$, $F_{mB}$ to the optical comb generators 16A, 16B.

Here, the optical comb generation device 10 generates two types of optical combs as a reference light pulse and a measuring light pulse for performing an absolute distance measurement requiring a switching of frequencies in a three-dimensional profiler or an optical comb distance meter described in Patent Document 1, Patent Document 2 and else, and as indicated in Table 1, by supplying the four types of modulation signals $F_{m1}$, $F_{m2}$, $F_{m3}$, $F_{m4}$ to the optical comb generators 16A, 16B as the driving signals $F_{mA}$, $F_{mB}$ by switching the modulation signals cyclically by the switching unit 14, two types of optical combs with mutually different modulation frequencies switched cyclically are output.

TABLE 1

| Setting | OFCG1/OFCG2 | Phase difference |
|---------|-------------|------------------|
| #1 | $f_m/(f_m + \Delta f)$ | $-2\pi f_m T$ |
| #2 | $(f_m + \Delta f_m)/(f_m + \Delta f_m + \Delta f)$ | $-2\pi(f_m + \Delta f_m)T$ |
| #3 | $(f_m + \Delta f)/f_m$ | $-2\pi(f_m + \Delta f)T$ |
| #4 | $(f_m + \Delta f_m + \Delta f)/(f_m + \Delta f_m)$ | $-2\pi(f_m + \Delta f_m + \Delta f)T$ |

Table 1 indicates a transition state OFCG1/OFCG2 of the driving signals $F_{mA}$, $F_{mB}$ of the two optical comb generators 16A, 16B in settings of #1 to #4 and its phase difference, and frequencies of the driving signals are, for example $\Delta f$=500 kHz, $\Delta f_m$=10 MHZ, $f_m$=$F_{m1}$ (25000 MHZ), $f_m+\Delta f_m$=$F_{m2}$ (25010 MHZ), $f_m+\Delta f$=$F_{m3}$ (25000.5 MHz), and $f_m+\Delta f_m+\Delta f$=$F_{m4}$ (25010.5 MHz).

FIG. 2 is a state transition diagram illustrating a state transition of the driving signals $F_{mA}$, $F_{mB}$ supplied to the two optical comb generators 16A, 16B in the optical comb generation device 10.

Here, in the optical comb distance meter, by using a reference light pulse and a measuring light pulse with coherence emitted as a pulse from two optical comb generators driven by two types of modulation signals with different frequencies in principle, a frequency analysis of an interference signal (hereinafter, referred to as a reference signal) obtained by a reference light detector and an interference signal (hereinafter, referred to as a measuring signal) obtained by a measuring light detector is performed by a signal processing unit, and a mode number counted from a center frequency of an optical comb is defined as P, a phase difference of P-order mode of the reference signal and the measuring signal is calculated to offset a light phase difference of an optical comb production and transmission process from the optical comb generators to a reference point, and then, a distance from the reference point to a measuring surface is calculated by determining a phase difference of signal pulses by calculating an increment of a phase difference per one order in a frequency axis.

In addition, when a measuring distance is beyond a half-wavelength of a modulation frequency $f_m$, a distance of integral multiple of a half-wavelength will be unidentifiable due to a periodicity of an object light, and a distance cannot be determined uniquely, so measurements are performed four times by using the reference light pulse and the measuring light pulse in which modulation frequencies are set in four ways as indicated in Table 1, and in the signal processing unit, a distance beyond an ambiguity distance ($L_a$=c/2$f_m$ c: light speed) corresponding to a half-wavelength is calculated by using each of phase difference obtained by performing same process.

In other words, a phase difference of the reference signal and the measuring signal obtained by measuring with the modulation frequencies set in four ways as indicated in Table 1 will be: $-2\pi f_m T$ in a setting of #1 in which modulation frequencies of modulation signals for driving two optical comb generators (OFCG1, OFCG2) are $f_m$ and $f_m+\Delta f$; $-2\pi(f_m+\Delta f_m)T$ in a setting of #2 in which the modulation frequencies of the modulation signals are $f_m+\Delta f_m$ and $f_m+\Delta f_m+\Delta f$; $-2\pi(f_m+\Delta f)T$ in a setting of #3 in which the modulation frequencies of the modulation signals are $f_m+\Delta f$ and $f_m$; and $-2\pi(f_m+\Delta f_m+\Delta f)T$ in a setting of #4 in which the modulation frequencies of the modulation signals are $f_m+\Delta f_m+\Delta f$ and $f_m+\Delta f_m$.

When a distance ($L_a$=c/2$f_m$ c: light speed) is also long, a phase difference ($-2\pi f_m T$) of the reference signal and the measuring signal will be in a form of $\varphi+2m\pi$ wherein m is an integer, and $\varphi$ can be determined by calculation, but an integer value m is unidentifiable.

On the other hand, a difference between the phase difference $-2\pi f_m T$ of the reference signal and the measuring signal in the setting of #1 and the phase difference $-2\pi(f_m+\Delta f_m)T$ of the reference signal and the measuring signal in the setting of #2 is $2\pi\Delta f_m T$, and also, a difference between the phase difference $-2\pi(f_m+\Delta f)T$ of the reference signal and the measuring signal in the setting of #3 and the phase difference $-2\pi(f_m+\Delta f_m+\Delta f)T$ of the reference signal and the measuring signal in the setting of #4 is $2\pi\Delta f_m T$, and a phase will be determined uniquely until a distance (when $\Delta f_m$=10 MHz, La is 15 m) corresponding to a half-wavelength of $\Delta f_m$.

And, the integer m can be determined by comparing with the phase difference of #1 by multiplying this phase by $f_m/\Delta f_m$.

Further, $2\pi\Delta fT$ is obtained from a difference between the phase difference $-2\pi f_m T$ in the setting of #1 and the phase difference $-2\pi(f_m+\Delta f)T$ in the setting of #3.

Further, $2\pi\Delta fT$ is obtained from a difference between the phase difference $-2\pi(f_m+\Delta f_m)T$ in the setting of #2 and the phase difference $-2\pi(f_m+\Delta f_m+\Delta f)T$ in the setting of #4.

Here, when $f_m$=25 GHz, $\Delta f$=500 kHz, $\Delta f_m$=10 MHz, as $\Delta f$=500 kHz, a distance measurement until La=300 m can be performed.

In an optical comb distance meter mounting this optical comb generation device 10, an absolute distance measurement is performed by using the reference signal and the measuring signal obtained by measuring with the modulation frequencies set in four ways as indicated in Table 1. In other words, after maintaining one state for a certain time, it will be transit to other state, and a signal phase measurement of the state is performed at a certain period, and a calculation process of an absolute distance is performed by using phases of setting states of #1, #2, #3, #4.

A measurement speed in the optical comb distance meter is 500 kHz as equal to $\Delta f$ in a relative distance measurement within 6 mm, but in an absolute distance measurement requiring a switching of frequencies, it will be a time including a frequency switching time and an absolute distance calculation time.

In the optical comb generation device 10, a driving state of the two optical comb generators 16A, 16B can be transit rapidly by switching the four types of modulation signals $F_{m1}$, $F_{m2}$, $F_{m3}$, $F_{m4}$ cyclically by the switching unit 14, and a measuring time of an absolute distance can be shortened by using as two optical comb light sources for performing absolute distance measurement by switching modulation frequencies of the reference signal and the measuring signal.

In other words, as described later, when setting to switch oscillation frequencies of PLL oscillators at real time to obtain M types of modulation signals with mutually different modulation frequencies by the PLL oscillators capable of setting to switch oscillation frequencies freely, a settling time required for obtaining a stable frequency signal with target frequency phase-locked to a set frequency by switching an oscillation frequency will be long, so in an application such as for distance measurement with respect to a moving body requiring a rapid measuring process, it is not practical as it takes time to measure an absolute distance, but the optical comb generation device 10 is capable of performing an absolute distance measurement with high accuracy by shortening a measuring time of an absolute distance, even with respect to a moving body in which a measuring time of an absolute distance is required to be shortened as moving speed increases In addition, when performing a distance measurement until 15 m only, it can be performed by the settings of #1 and #2 only, or by the settings of #3 and #4 only, but by the settings of #1, #2, #3, #4 as the above, in other words, by switching the four types of modulation signals $F_{m1}$, $F_{m2}$, $F_{m3}$, $F_{m4}$ cyclically by the switching unit 14, a distance measuring range is expanded to 300 m, and also, an absolute distance result with high accuracy can be obtained by reducing a phase offset according to a signal transmission path of a distance other than a distance to be measured. In other words, when switching modulation frequencies of two optical comb generators (OFCG1, OFCG2) 16A, 16B, in a phase derived from a distance to be measured, an absolute value will not be changed, but a sign will be inversed. On the other hand, in an offset derived from a length of a cable of an interference signal transmission path, a sign will not be changed and will be a constant value. Therefore, a phase value excluding an offset can be determined by subtracting results of two phase measurements and dividing by two.

Here, in a cyclic state transition, when #1 is considered as a starting point, a switching is set such that it will continue to #3, #2, #4, #2, #3, and return to #1. This setting is determined by considering to perform in a shortest time and with a smallest distance measurement error, even when an object to be measured is moving with a speed, by calculating a distance by adding measurement results in which frequencies for driving OFCG1 and OFCG2 are switched and measurement results in which an order of switching of frequencies is reversed.

When performing two phase measurements for obtaining a phase value excluding a phase offset, an order of switching of four modulation frequencies indicated in table 1 is optional in principle, but a distance measurement error and a measurement processing time can be decreased, by adopting a cyclic way for switching one direction and reverse direction of a switching order successively, as a repetition of #1→#2→#3→#4→#4→#3→#2→#1 or a repetition of #1→#3→#2→#4→#4→#2→#3→#1.

In addition, when performing an absolute distance measurement, a distance measurement is performed basically with four "transition states" of frequencies as one set, but in principle, a case when $\Delta f_m = \Delta f$ is not denied, so three types of modulation frequencies of $f_m$, $f_m + \Delta f$, $f_m + 2 \Delta f$ are also possible. In an optical comb generation device relating to the present invention, driving states of two optical comb generators can be transit rapidly, by comprising: an optical comb generation unit for outputting M (M is an integer of two or more) types of optical combs with mutually different modulation frequencies in which N (N is an integer of three or more) types of modulation frequencies are switched cyclically, by respectively modulating a phase or an intensity periodically; and a drive control unit for controlling to output the M types of optical combs by supplying M types of driving signals phase-locked to a reference frequency signal to the optical comb generation unit, and a measuring time of an absolute distance can be shortened, by using as two optical comb light sources for performing an absolute distance measurement by switching modulation frequencies of a reference signal and a measuring signal.

Figure 3:
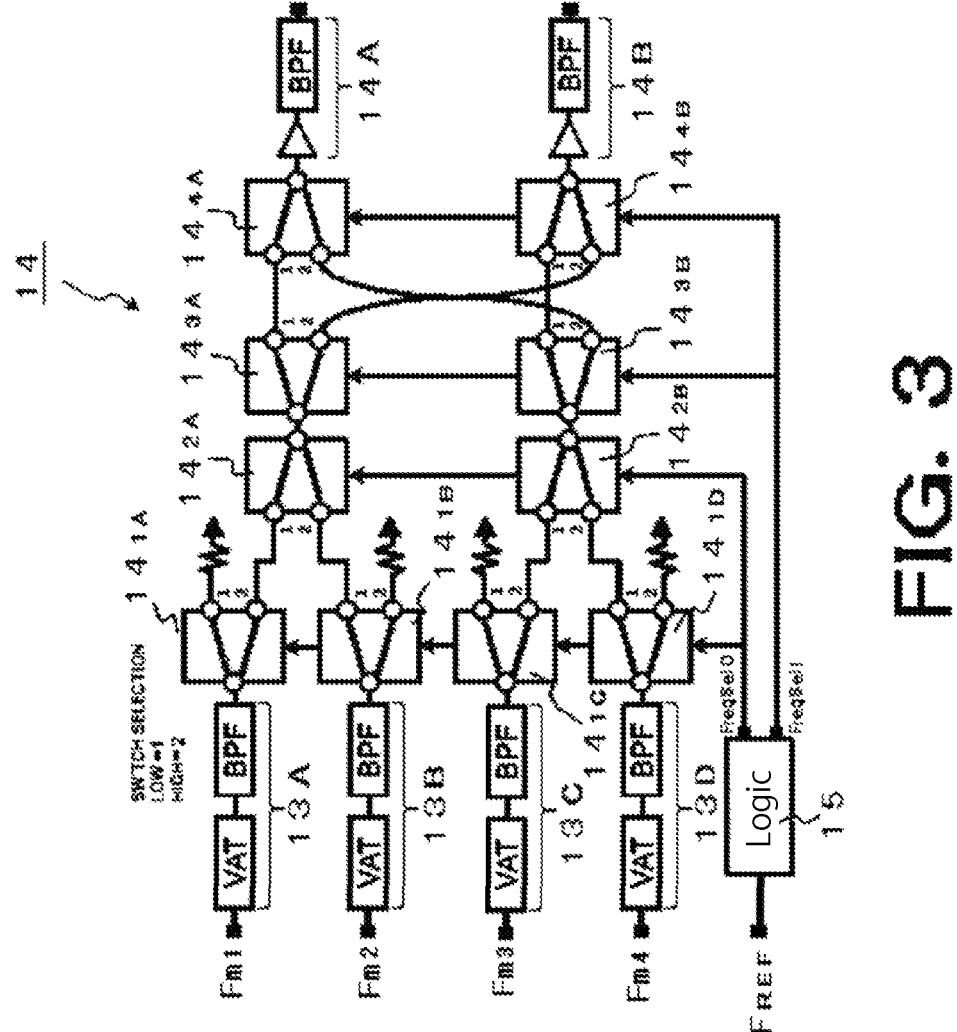
FIG. 3 is a block diagram illustrating a concrete example of a switching unit in the optical comb generation device.

Here, FIG. 3 is a block diagram illustrating a concrete example of a switching unit 14 with four inputs and two outputs comprised in the optical comb generation device 10.

In other words, as illustrated in a block diagram of FIG. 3, in the switching unit 14: four switching circuits $14_{1A}$, $14_{1B}$, $14_{1C}$, $14_{1D}$ of first stage respectively with one input and two outputs which are inputted with four types of modulation signals $F_{m1}$, $F_{m2}$, $F_{m3}$, $F_{m4}$ generated by PLL oscillators 12A, 12B, 12C, 12D of the modulation signal generation unit 12 via isolators 13A, 13B, 13C, 13D connected to the modulation signal generation unit 12; two switching circuits $14_{2A}$, $14_{2B}$ of next stage respectively with two inputs and one output which are inputted with the four types of modulation signals $F_{m1}$, $F_{m2}$, $F_{m3}$, $F_{m4}$ via the four switching circuits $14_{1A}$, $14_{1B}$, $14_{1C}$, $14_{1D}$ of first stage; two switching circuits $14_{3A}$, $14_{3B}$ of further next stage respectively with one input and two outputs connected to each output terminal of the two switching circuits $14_{2A}$, $14_{2B}$; and two switching circuits $14_{4A}$, $14_{4B}$ of final stage respectively with two inputs and one output connected to the two switching circuits $14_{3A}$, $14_{3B}$, are controlled of its switching by a control unit (logic circuit) 15 by synchronized to a reference frequency signal $F_{REF}$ of 10 MHz, and as transition states of driving signals $F_{mA}$, $F_{mB}$ of the two optical comb generators 16A, 16B are illustrated in FIG. 2, the four types of modulation signals $F_{m1}$, $F_{m2}$, $F_{m3}$, $F_{m4}$ supplied to the two optical comb generators 16A, 16B as driving signals $F_{mA}$, $F_{mB}$ are switched cyclically.

In this switching unit 14, in the four switching circuits $14_{1A}$, $14_{1B}$, $14_{1C}$, $14_{1D}$ of first stage, one of two output terminals is respectively connected to input terminals of the two switching circuits $14_{2A}$, $14_{2B}$ of next stage, and other output terminal is terminated by a terminal resistor.

In addition, in a concrete example of the switching unit 14 illustrated in a block diagram of FIG. 3, the four types of modulation signals $F_{m1}$, $F_{m2}$, $F_{m3}$, $F_{m4}$ are input to the four switching circuits $14_{1A}$, $14_{1B}$, $14_{1C}$, $14_{1D}$ of first stage via the isolators 13A, 13B, 13C, 13D respectively composed of an isolator circuit combining a variable attenuator (VAT) and a band pass filter (BPF), and the four types of modulation signals $F_{m1}$, $F_{m2}$, $F_{m3}$, $F_{m4}$ switched cyclically are output from output terminals of the two switching circuits $14_{4A}$, $14_{4B}$ of final stage via a first and second band pass filters 14A, 14B respectively composed of an isolator circuit combining an isolation amplifier and a band pass filter (BPF).

Figure 4:
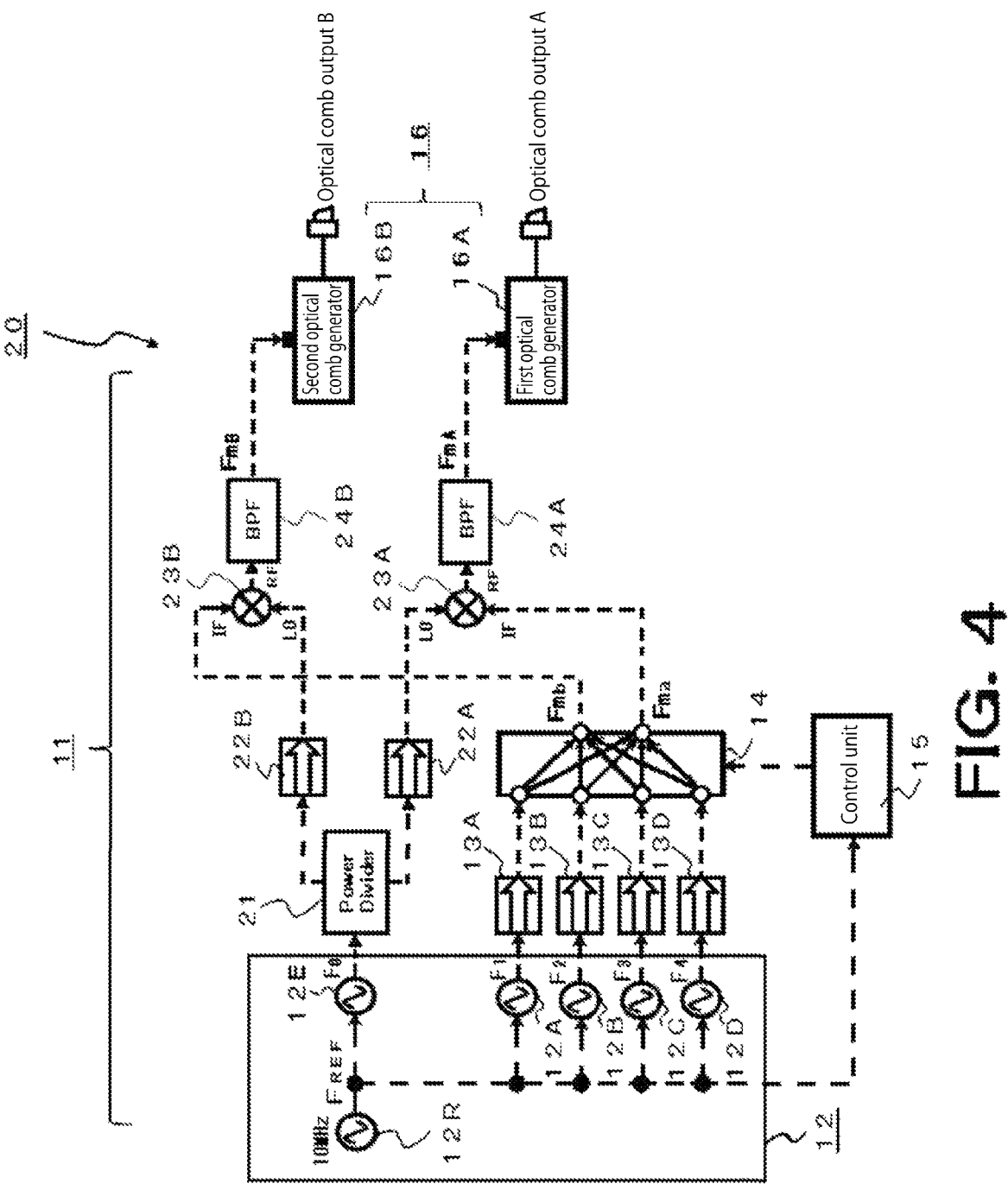
FIG. 4 is a block diagram illustrating other example of the optical comb generation device applying the present invention.

Next, an optical comb generation device 20 illustrated in FIG. 4 obtains modulation signals $F_{mA}$, $F_{mB}$ with 25 GHz band by up-converting frequency signals $F_1$, $F_2$, $F_3$, $F_4$ with 1 GHz band generated by the modulation signal generation unit 12 by frequency converters 23A, 23B, as driving signals to be supplied to the two optical comb generators 16A, 16B in the optical comb generation device 10 illustrated in FIG. 1.

The modulation signal generation unit 12 of the drive control unit 11 in the optical comb generation device 20 comprises four PLL oscillators 12A, 12B, 12C, 12D for generating frequency signals $F_1$, $F_2$, $F_3$, $F_4$ with 1 GHz band and one PLL oscillator 12E for generating a frequency signal $F_0$ with 24 GHz.

In this optical comb generation device 20, a fifth PLL oscillator 12E of the modulation signal generation unit 12 supplies a frequency signal $F_0$ with 24 GHz fixed to a frequency fo by phase-locked by a PLL circuit to a reference frequency signal $F_{REF}$ supplied from a reference oscillator 12R to the two frequency converters 23A, 23B via a power divider 21.

Also, in the modulation signal generation unit 12, a first PLL oscillator 12A generates a first frequency signal $F_1$ in which a frequency is fixed to a frequency $f_m'$ ($f_m' = 1000$ MHz) by phase-locked by the PLL circuit to the reference frequency signal $F_{REF}$, for example with a frequency of 10 MHz, generated by the reference oscillator 12R.

Also, a second PLL oscillator 12B generates a second frequency signal $F_2$ in which a frequency is fixed to a frequency $f_m' + \Delta f_m$ ($f_m' + \Delta f_m = 1010$ MHZ) by phase-locked by the PLL circuit to the reference frequency signal $F_{REF}$ generated by the reference oscillator 12R.

Also, a third PLL oscillator 12C generates a third frequency signal $F_3$ in which a frequency is fixed to a frequency $f_m' + \Delta f$ ($f_m' + \Delta f = 1000.5$ MHz) by phase-locked by the PLL circuit to the reference frequency signal $F_{REF}$ generated by the reference oscillator 12R.

Also, a fourth PLL oscillator 12D generates a fourth frequency signal $F_4$ in which a frequency is fixed to a frequency $f_m'+\Delta f_m+\Delta f$ ($f_m'+\Delta f_m+\Delta f$=1010.5 MHZ) by phase-locked by the PLL circuit to the reference frequency signal $F_{REF}$ generated by the reference oscillator 12R.

In the modulation signal generation unit 12, the first to fourth frequency signals $F_1$, $F_2$, $F_3$, $F_4$ obtained by the first to fourth PLL oscillators 12A, 12B, 12C, 12D are input to the switching unit 14 with four inputs and two outputs via the isolators 13A, 13B, 13C, 13D.

The switching unit 14 functions as a selector switch with four inputs and two outputs for supplying first and second modulation signals $F_{mA}$, $F_{mB}$, in which the four types of frequency signals $F_1$, $F_2$, $F_3$, $F_4$ with 1 GHz band are switched cyclically, to the two frequency converters 23A, 23B, by outputting the first to fourth frequency signals $F_1$, $F_2$, $F_3$, $F_4$ from two output terminals by cyclically switching the first to fourth frequency signals $F_1$, $F_2$, $F_3$, $F_4$ input from the modulation signal generation unit 12 to four input terminals via the isolators 13A, 13B, 13C, 13D, by synchronizing to the reference frequency signal $F_{REF}$ given by the reference oscillator 12R of the modulation signal generation unit 12.

Here, by inserting the isolators 13A, 13B, 13C, 13D between the modulation signal generation unit 12 and the switching unit 14, and by inputting the frequency signals $F_1$, $F_2$, $F_3$, $F_4$ from the modulation signal generation unit 12 to the switching unit 14 via the isolators 13A, 13B, 13C, 13D, an operation of a signal source is prevented from being unstable with a load fluctuation by an opening or a short-circuit of circuits in and after the switching unit 14.

As the isolators 13A, 13B, 13C, 13D, a microwave amplifier with large reverse isolation, a Pi-pad attenuator or a T-pad attenuator, an isolation element such as a microwave isolator using ferrite, and an isolation circuit combining a variable attenuator and a band pass filter, or an isolation circuit combining an isolation amplifier and a resistance attenuator or a band pass filter, can be used.

And, the first and second frequency converters 23A, 23B uses the first and second modulation signals $F_{ma}$, $F_{mb}$ output alternately by cyclically switching the frequency signals $F_1$, $F_2$, $F_3$, $F_4$ with four types of frequencies of 1 GHz band, i.e. $f_m'$=1000 MHZ, $f_m'+\Delta f_m$=1010 MHz, $f_m'+\Delta f$=1000.5 MHz, $f_m'+\Delta f_m+\Delta f$=1010.5 MHz, from the switching unit, and the frequency signal $F_0$ with a frequency (for example, 24 GHz) supplied from the fifth PLL oscillator 12E, to obtain the first and second modulation signals $F_{mA}$, $F_{mB}$ in which a frequency is converted to four types of modulation frequencies of 25 GHz band, i.e. $f_m$=25000 MHz, $f_m+\Delta f_m$=25010 MHz, $f_m+\Delta f$=25000.5 MHZ, $f_m+\Delta f_m+\Delta f$=25010.5 MHz, and the obtained modulation signals are supplied to the first and second optical comb generators 16A, 16B as driving signals.

In other words, the first and second frequency converters 23A, 23B function as up converters for converting frequencies of the first and second modulation signals $F_{ma}$, $F_{mb}$ composed of the frequency signals $F_1$, $F_2$, $F_3$, $F_4$ with 1 GHz band to the first and second modulation signals $F_{mA}$, $F_{mB}$ with 25 GHz band to be supplied to the first and second optical comb generators 16A, 16B as driving signals.

Figure 5:
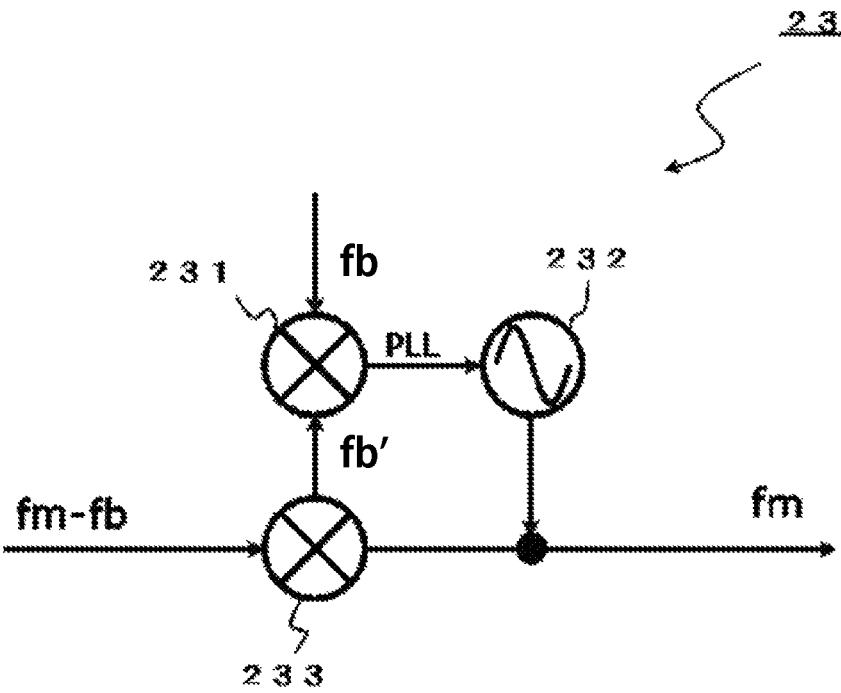
FIG. 5 is a block diagram illustrating an example of a frequency converter used in the optical comb generation device.

As the first and second frequency converters 23A, 23B, a frequency mixer such as a diode, a double balanced mixer, and an IQ mixer, or a frequency converter 23 using a phase synchronization with a structure as illustrated in FIG. 5 can be used.

Here, when a frequency mixer such as a diode, a double balanced mixer, and an IQ mixer is used as the first and second frequency converters 23A, 23B, as the frequency mixer is a nonlinear element, frequency components other than frequency components ($f_m$, $f_m+\Delta f_m$, $f_m+\Delta f$, $f_m+\Delta f_m+\Delta f$)

necessary for setting states of #1, #2, #3, #4 will be generated, so band pass filters 24A, 24B are respectively inserted at output side of the frequency converters 23A, 23B to supply only necessary frequency components to the optical comb generators 16A, 16B as driving signals.

For example, in the first frequency converter 23A using the frequency mixer, for example in a setting of #1, not only necessary frequency components $f_m$, but also a spurious of undesired frequency components $f_m+Sf_b$ (excluding S=0) will be generated. Here, S is an integer, and $f_b$ is a frequency of modulation signal before converting a frequency input to the frequency converter 23A. When the undesired frequency components are mixed to the first modulation signal $F_{mA}$ supplied to a first optical comb generator 16A as a driving signal, it will be a spurious in an optical comb generation by the first optical comb generator 16A, and it may influence a measurement value. A band pass filter 24A is used to avoid this influence by passing through only necessary frequency components $f_m$ and attenuates other frequency components to the extent that it will not influence a measurement specification.

Also, the undesired frequency components $f_m+Sf_b$ generated by the first frequency converter 23A using the frequency mixer propagate in a direction of a power divider 21 at input side, and the power divider 21 is also not having an ideal characteristic, so it reaches the second frequency converter 23B. By converting a frequency of the undesired frequency components $f_m+Sf_b$ reached the second frequency converter 23B, frequency components $f_m+Sf_b+S'$ ($f_b+\Delta f$) will be mixed to an output of the second frequency converter 23B. Here, ($f_b+\Delta f$) is a frequency of modulation signal before converting a frequency input to the frequency converter 23B.

Here, S' is an integer. Frequency components other than S+S'=0 will be outside of a range from $f_m$ to $+f_b$ or $-f_b$, so it can be attenuated by the band pass filter 24A for passing through a necessary frequency $f_m+\Delta f$. However, frequency components of S+S'=0 will be $f_m+S'$ $\Delta f$, and it will be frequency components extremely near $f_m+\Delta f_m$ of necessary S'=1, so it is difficult to eliminate by the band pass filter 24A. However, by inserting isolators 22A, 22B respectively at input side, reflection components by the frequency converters 23A, 23B can be attenuated.

As the isolators 22A, 22B, a microwave amplifier with large reverse isolation, a Pi-pad attenuator or a T-pad attenuator, an isolation element such as a microwave isolator using ferrite, and an isolation circuit combining a variable attenuator and a band pass filter, or an isolation circuit combining an isolation amplifier and a resistance attenuator or a band pass filter, can be used.

In the optical comb generation device 20, practically, these features will be combined and an optimum structure with improved performance will be adopted.

In addition, in the optical comb generation device 20, when $f_b$ and $f_b+\Delta f$ are about 100 MHz, an improvement of a relative phase noise of 40 dB or more is expected, but when $f_b$=100 MHz and $f_m$=25 GHz, as the band pass filters 24A, 24B, a filter with extremely high Q value of 2500 or more will be required for reducing spurious of $f_m+f_b$ or $f_m-f_b$.

Here, as the frequency converters 23A, 23B, not only a frequency mixer such as a diode, a double balanced mixer, and an IQ mixer, but also, a frequency converter 23 using a phase synchronization with a structure as illustrated in FIG. 5 may be used.

This frequency converter 23 comprises: a phase comparator 231; a voltage-controlled oscillator 232 in which an oscillation phase is controlled by the phase comparator 231;

and a frequency mixer 233 to which frequency signals output from the voltage-controlled oscillator 232 will be input after being branched.

In the frequency converter 23, a modulation signal $F_b$ with a modulation frequency $f_b$ of 100 MHz band is input to the phase comparator 231, and a frequency signal $F_0$ with 24.9 GHz is supplied from the fifth PLL oscillator 12E to the frequency mixer 233 as a frequency signal with a frequency $f_m - f_b$. By controlling an oscillation phase of the voltage-controlled oscillator 232 by a phase comparison output obtained by a phase comparison by the phase comparator 231 and the modulation signal $F_b$ with the modulation frequency $f_b$ of 100 MHz band by obtaining a frequency signal with a difference frequency $f_b'$ of a modulation signal $F_m$ with a modulation frequency $f_m$ of 25 GHz band output from the voltage-controlled oscillator 232 and the frequency signal $F_0$ with 24.9 GHz band by the frequency mixer 233, the modulation signal $F_m$ with the modulation frequency $f_m$ of 25 GHz band, in which a frequency is fixed by phase-locked to the modulation signal $F_b$ with the modulation frequency $f_b$ of 100 MHz band, is output from the voltage-controlled oscillator 232.

In other words, when the frequency converter 23 is used for example as the frequency converter 23A, by supplying a first modulation signal $F_{ma}$ in which four types of frequency signals $F_1$, $F_2$, $F_3$, $F_4$ with 100 MHz band are switched cyclically by the switching unit 14 to the phase comparator 231, a phase comparison of the first modulation signal $F_{ma}$ and the frequency signal of the difference frequency $f_b'$ is performed and fed back to the voltage-controlled oscillator 232, and an oscillation phase of the voltage-controlled oscillator 232 is controlled to output, from the voltage-controlled oscillator 232, a modulation signal $F_{mA}$ with a frequency $f_{mA}$ of 25 GHz band up-converted from the first modulation signal $F_{ma}$ with 100 MHz band.

Also, when the frequency converter 23 is used for example as the frequency converter 23B, by supplying a second modulation signal $F_{mb}$ in which four types of frequency signals $F_1$, $F_2$, $F_3$, $F_4$ with 100 MHz band are switched cyclically by the switching unit 14 to the phase comparator 231, a phase comparison of the second modulation signal $F_{mb}$ and the frequency signal of the difference frequency $f_b'$ is performed and fed back to the voltage-controlled oscillator 232, and an oscillation phase of the voltage-controlled oscillator 232 is controlled to output, from the voltage-controlled oscillator 232, a modulation signal $F_{mB}$ with a frequency $f_{mB}$ of 25 GHz band up-converted from the second modulation signal $F_{mb}$ with 100 MHz band.

Here, in the frequency converter 23, the phase comparator 231 is a phase comparator such as a double balanced mixer, and it is having a low noise as it performs a phase comparison of identical frequencies. Also, a control band can be large, for example as 10 MHz or more, as a frequency comparison is performed with a modulation frequency $f_b$ of 100 MHz band. Therefore, a relative phase noise of outputs of the frequency converters 23A, 23B will be equal to a relative phase noise of the signals with the modulation frequencies $f_b$ and $f_b + \Delta f$ of 100 MHz band. Further, as a control band of PLL is large, a settling time required for obtaining a stable frequency signal with target frequency will be shortened.

Also, an output of the frequency converter 23 is sufficiently larger than a control band of a phase synchronization of signals with the modulation frequencies $f_b$ or $f_b + \Delta f$ of 100 MHz band, so a spurious $f_m + f_b$ or a spurious $f_m - f_b$ of the voltage-controlled oscillator 232 will be small.

Therefore, by using the frequency converter 23 using the phase synchronization as the frequency converters 23A, 23B, the band pass filters 24A, 24B at output side will be unnecessary, or a specification can be reduced.

Here, as a PLL oscillator can be set to switch an oscillation frequency freely, the drive control unit 11 can obtain M types of modulation signals with mutually different modulation frequencies from M PLL oscillators without requiring a switching unit, by setting to switch respective oscillation frequencies of M PLL oscillators cyclically, and can supply to M optical comb generators as driving signals. However, in a PLL oscillator capable of setting to switch an oscillation frequency freely, when setting to switch an oscillation frequency, a settling time required for obtaining a stable frequency signal with target frequency phase-locked to a set frequency by switching an oscillation frequency will be long, so in an application requiring a rapid measuring process, it is not practical to set to switch an oscillation frequency of a PLL oscillator at real time for obtaining M types of modulation signals with mutually different modulation frequencies.

In addition, it is not practical to set to switch an oscillation frequency of a PLL oscillator at real time, but a DDS oscillator can be used to set to switch an oscillation frequency at real time.

Figure 6:
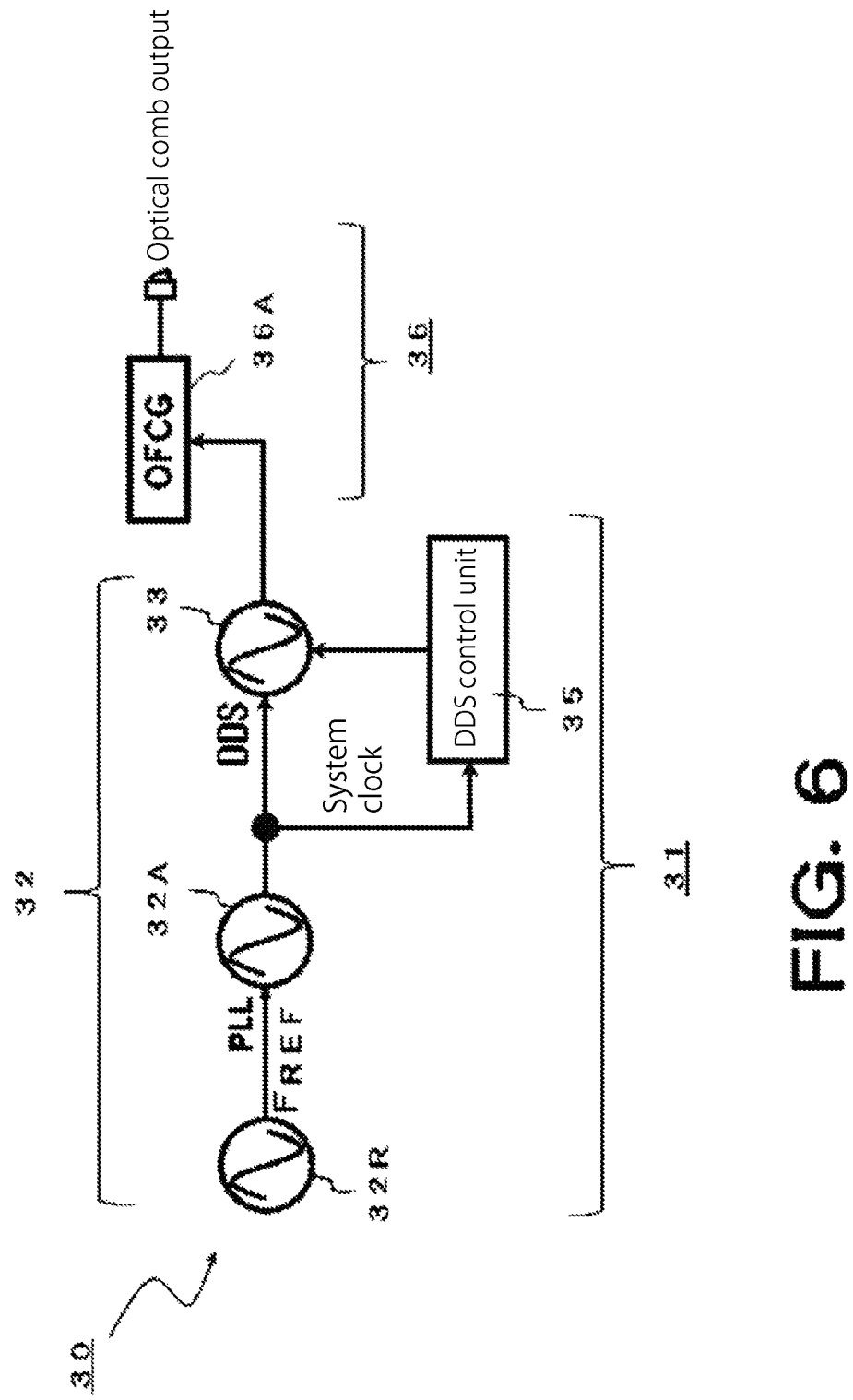
FIG. 6 is a block diagram illustrating a basic structure of the optical comb generation device in which the optical comb generators are driven by DDS oscillators.

DDS is an abbreviation of Direct Digital Synthesizer, and it is known as an oscillator capable of obtaining an output of an optional frequency only by setting a frequency data (phase increment). A basic structure of an optical comb generation device 30 in which an optical comb generator 36A of an optical comb generation unit 36 is driven by a drive control unit 31 comprising a modulation signal generation unit 32 using a DDS oscillator 33 is illustrated in a block diagram of FIG. 6.

The drive control unit 31 in the optical comb generation device 30 is composed of the modulation signal generation unit 32 using the DDS oscillator 33 and a DDS control unit 35 for controlling an operation of the DDS oscillator 33, and modulation signals with various modulation frequencies are supplied from the DDS oscillator 33 in which an operation is controlled by the DDS control unit 35 to the optical comb generator 36A of the optical comb generation unit 36 as driving signals.

The modulation signal generation unit 32 comprises: a PLL oscillator 32A for generating a system clock by synchronizing to a reference frequency signal $F_{REF}$ generated by a reference signal generator 32R; and the DDS oscillator 33 driven by this system clock, and by controlling an operation of the DDS oscillator 33 by the DDS control unit 35, modulation signals with various modulation frequencies are output from the DDS oscillator 33 by switching frequencies in a state that a phase continues at an optional timing set by the DDS control unit 35.

The optical comb generator 36A of the optical comb generation unit 36 generates optical combs by driven by modulation signals capable of instantly switching various modulation frequencies supplied from the DDS oscillator 33 as driving signals.

Here, the DDS oscillator 33 is different from an oscillator by a phase synchronization method and is driven by the system clock, and reads out a waveform data of ROM table in selected DDS and outputs frequency signals by DA converting the waveform data, so a switching of frequencies is performed instantly, and there is no relaxation time such as a phase synchronization. This contributes to a simplification of an optical comb generation system for switching modulation frequencies, and contributes to a high speed measurement by reducing dead time of the relaxation time.

Figure 7:
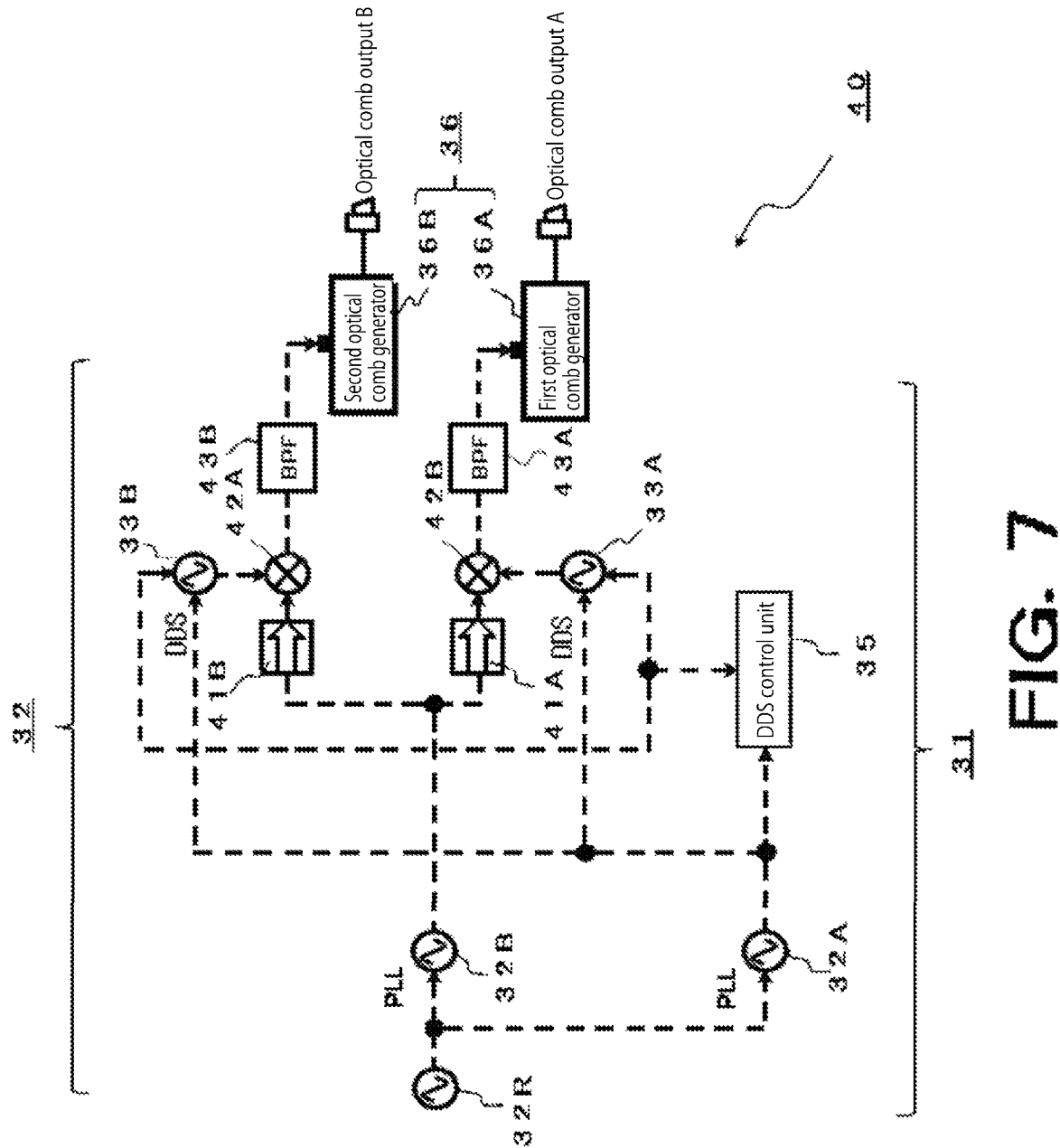
FIG. 7 is a block diagram illustrating an example of the optical comb generation device relating to the present invention in which the optical comb generators are driven by DDS oscillators.

In an optical comb generation device 40 illustrated in a block diagram of FIG. 7, plural M (here, M=2) optical comb generators 36A, 36B for optical comb distance meter for performing an absolute distance measurement by switching modulation frequencies of a reference signal and a measuring signal are driven by plural M (here, M=2) DDS oscillators 33A, 33B.

In the optical comb generation device 40, the DDS oscillators 33A, 33B are driven by a system clock generated by a PLL oscillator 32A by synchronizing to a reference frequency signal $F_{REF}$ generated by a reference signal generator 32R, and outputs modulation signals with various modulation frequencies by switching frequencies in a state that a phase continues at an optional timing set by a DDS control unit 35. Here, the DDS oscillators 33A, 33B alternately output first and second modulation signals $F_{ma}$, $F_{mb}$ in which four types of frequencies with 1 GHz band, i.e. $f_m'$=1000 MHZ, $f_m'$+$\Delta f_m$=1010 MHz, $f_m'$+$\Delta f$=1000.5 MHZ, $f_m'$+$\Delta f_m$+$\Delta f$=1010.5 MHz, are switched cyclically at a timing to be in a transition state illustrated in FIG. 2.

And, a drive control unit 31 in the optical comb generation device 40 obtains modulation signals $F_{mA}$, $F_{mB}$ with 25 GHz band by up-converting the first and second modulation signals $F_{ma}$, $F_{mb}$, in which four types of frequencies with 1 GHz band, i.e. $f_m'$=1000 MHz, $f_m'$+$\Delta f_m$=1010 MHz, $f_m'$+$\Delta f$=1000.5 MHz, $f_m'$+$\Delta f_m$+$\Delta f$=1010.5 MHz, generated by the DDS oscillators 33A, 33B of the modulation signal generation unit 32 are switched cyclically, by frequency converters 42A, 42B, and supplies the modulation signals $F_{mA}$, $F_{mB}$ to two optical comb generators 36A, 36B comprised in an optical comb generation unit 36 as driving signals.

In other words, the modulation signal generation unit 32 in the optical comb generation device 40 comprises a PLL oscillator 32B for generating a frequency signal with a frequency of 24 GHz by synchronizing to the reference frequency signal $F_{REF}$ generated by the reference signal generator 32R, and by supplying the frequency signal with a frequency of 24 GHz generated by the PLL oscillator 32B to the frequency converters 42A, 42B via isolators 41A, 41B, the first and second modulation signals $F_{ma}$, $F_{mb}$ with 1 GHz band generated by the DDS oscillators 33A, 33B are up-converted by the frequency converters 42A, 42B to the modulation signals $F_{mA}$, $F_{mB}$ with 25 GHz band, and the modulation signals $F_{mA}$, $F_{mB}$ are supplied to the two optical comb generators 36A, 36B comprised in the optical comb generation unit 36 as driving signals via band pass filters 43A, 43B.

In addition, by using the frequency converter 23 using phase synchronization illustrated in FIG. 5 as the frequency converters 42A, 42B, the band pass filters 43A, 43B at output side will be unnecessary, or a specification can be reduced.

In the optical comb generation device 40, by controlling an operation of the DDS oscillators 33A, 33B by the DDS control unit 35, driving states of the two optical comb generators 36A, 36B comprised in the optical comb generation unit 36 can be transit rapidly by switching the modulation frequencies cyclically in a state that a phase continues, and a measuring time of an absolute distance can be shortened by using as two optical comb light sources for performing an absolute distance measurement by switching modulation frequencies of the reference signal and the measuring signal.

Here, in the optical comb generation device 10, 20, 40, when N=4, M=2, M (M=2) types of optical combs with mutually different modulation frequencies in which N (N=4) types of modulation frequencies are switched cyclically are output from the two optical comb generators 16A, 16B (36A, 36B) of the optical comb generation unit 16 (36), but a number N of the modulation frequencies is not limited to N=4, and N could be an integer of three or more, also, a number M of the optical comb generators is not limited to M=2, and M could be an integer of two or more, and the drive control unit 11 (31) supplies M types of driving signals with mutually different modulation frequencies, in which N types of modulation frequencies phase-locked to the reference frequency signal $F_{REF}$ are switched cyclically, to the optical comb generation unit 16 (36) to perform a drive control for outputting M types of optical combs from the optical comb generation unit 16 (36).

For example, in the optical comb generation device 10, 20, the drive control unit 11 outputs M types of modulation signals with mutually different modulation frequencies in which N types of modulation signals with mutually different oscillation frequencies phase-locked to the reference frequency signal $F_{REF}$ given by the reference frequency signal generator 12R are switched cyclically, and for example, M types of modulation signals with mutually different modulation frequencies are obtained by cyclically switching N types of modulation signals with mutually different oscillation frequencies obtained by N PLL oscillators by the switching unit 14 with N inputs and M outputs, and the M types of modulation signals are supplied to M optical comb generators comprised in the optical comb generation unit as driving signals.

Also, in the optical comb generation device 40, the drive control unit 31 obtains M types of modulation signals with mutually different modulation frequencies, in which N types of modulation signals with mutually different oscillation frequencies phase-locked to the reference frequency signal $F_{REF}$ are switched cyclically, by M DDS oscillators, and the M types of modulation signals are supplied to M optical comb generators comprised in the optical comb generation unit as driving signals.

Also, in the optical comb generation device 10, 20, the drive control unit 11 outputs M types of optical combs from M optical comb generators comprised in the optical comb generation unit by supplying M types of modulation signals with mutually different modulation frequencies as driving signals, by cyclically switching, by the switching unit 14 with N inputs and M outputs, N types of modulation signals with mutually different oscillation frequencies phase-locked to the reference frequency signal $F_{REF}$ given by the reference frequency signal generator 12R, but as an optical comb generation device 50 illustrated in FIG. 8, M types of optical combs with mutually different modulation frequencies may be output selectively by an optical switch 51 with N inputs and M outputs from N types of optical combs generated by N optical comb generators 16A, 16B, . . . for generating N types of optical combs with mutually different modulation frequencies.

In this case, modulation frequencies of all optical combs are not required to be different, and it may be used for other switching such as different wavelength even some modulation frequencies are same. A set of optical combs with identical wavelength band with different modulation frequencies is necessary to be included for interference, but it also functions when optical combs with different wavelength band in combination with same modulation frequency are included.

Here, when N=4, M=2, an optical comb generation unit 16 in the optical comb generation device 50 comprises four optical comb generators 16A, 16B, 16C, 16D for generating four optical combs with mutually different modulation frequencies, and a drive control unit 11 comprises: a modulation signal generation unit 12 comprising four PLL oscillators 12A, 12B, 12C, 12D for generating N (N=4) types of modulation signals phase-locked to a reference frequency signal $F_{REF}$ given by a reference oscillator 12R; an optical switch 51 with four inputs and two outputs for selectively and cyclically outputting two types of optical combs with mutually different modulation frequencies from four types of optical combs generated by the optical comb generation unit 16; and a control unit 52 for controlling an operation to select optical combs by the optical switch 51 with four inputs and two outputs, and the optical comb generation device 50 outputs two types of optical combs selected cyclically from four types of optical combs with mutually different modulation frequencies or wavelength bands by the optical switch 51 with four inputs and two outputs.

The drive control unit 11 in the optical comb generation device 50 switches optical combs, so it is not necessary to switch modulation signals with mutually different modulation frequencies generated by the modulation signal generation unit 12.

Glossary of Drawing References

10, 20, 30, 40, 50 Optical comb generation device
11, 31 Drive control unit
12, 32 Modulation signal generation unit
12A, 12B, 12C, 12D, 12E, 32A, 32B PLL oscillator
12R, 32R Reference signal oscillator
13A, 13B, 13C, 13D, 22A, 22B, 41A, 41B Isolator
14 Switching unit
14A, 14B, 24A, 24B, 43A, 43B Band pass filter
15, 52 Control unit
16, 36 Optical comb generation unit
16A, 16B, 16C, 16D, 36A, 36B Optical comb generator
23, 23A, 23B Frequency converter
21 Power divider
33, 33A, 33B DDS oscillator
35 DDS controller
51 Optical switch
231 Phase comparator
232 Voltage-controlled oscillator
233 Frequency mixer

The invention claimed is:

1. An optical comb generation device for an optical comb distance measurement for measuring a distance from a time difference between an interference signal of a measuring light and an interference signal of a reference light, comprising:
an optical comb generation unit comprising M (M is an integer of two or more) optical comb generators; and
a drive control unit for controlling to output M types of optical combs from the optical comb generation unit by supplying M types of driving signals with mutually different modulation frequencies, in which N (N is an integer of three or more) types of modulation frequencies phase-locked to a reference frequency signal are switched cyclically, to the M optical comb generators, wherein the optical comb generation unit outputs, from the M optical comb generators, M types of optical combs with mutually different modulation frequencies in which N types of modulation frequencies are switched cyclically, by respectively modulating a phase or an intensity periodically.

2. The optical comb generation device according to claim 1, wherein the drive control unit comprises:
N signal sources for outputting N types of modulation signals with mutually different modulation frequencies phase-locked to the reference frequency signal;
a switching unit with N inputs and M outputs connected to the N signal sources; and
a switching control means for outputting M types of modulation signals with mutually different modulation frequencies in which N types of modulation signals are switched cyclically by controlling an operation of the switching unit,
wherein the M types of modulation signals are supplied to the M optical comb generators as driving signals.

3. The optical comb generation device according to claim 2, wherein the N signal sources generate N types of modulation signals respectively in a state that a modulation frequency is fixed to a modulation frequency phase-locked to a reference frequency signal by a PLL circuit.

4. The optical comb generation device according to claim 1, wherein the drive control unit comprises:
a signal source consisting of M DDS (Direct Digital Synthesizer) operating by a system clock phase-locked to the reference frequency signal; and
a switching control means for outputting M types of modulation signals with mutually different modulation frequencies in which N types of modulation frequencies are switched cyclically by controlling an operation of the M DDS,
wherein the M types of modulation signals are supplied to the optical comb generation unit as driving signals.

5. An optical comb generation device for an optical comb distance measurement for measuring a distance from a time difference between an interference signal of a measuring light and an interference signal of a reference light, comprising:
N signal sources for outputting N types of modulation signals with mutually different modulation frequencies phase-locked to a reference frequency signal as driving signals;
an optical comb generation unit comprising N optical comb generators for generating N types of optical combs with mutually different modulation frequencies by respectively modulating a phase or an intensity periodically and driven by the driving signals output from the N signal sources;
an optical switch with N inputs and M outputs for outputting M types of optical combs with mutually different modulation frequencies by cyclically selecting from N types of optical combs generated by the N optical comb generators comprised in the optical comb generation unit; and
an optical switch control unit for controlling an operation to select optical combs by the optical switch by synchronizing to the reference frequency signal.

6. The optical comb generation device according to claim 1, wherein the drive control unit controls to output, from the optical comb generation unit, M (M is an integer of two or more) types of optical combs with mutually different modulation frequencies in which N (N is an integer of three or more) types of modulation frequencies are switched cyclically, in a cyclic way to switch one direction and inverse direction of a switching order successively.

* * * * *